US012604354B2

(12) United States Patent
Peng et al.

(10) Patent No.: US 12,604,354 B2
(45) Date of Patent: Apr. 14, 2026

(54) COMMUNICATION PROCESSING METHOD OF TERMINAL INFORMATION AND RELATED DEVICE

(71) Applicant: HUAWEI TECHNOLOGIES CO., LTD., Shenzhen (CN)

(72) Inventors: Wenjie Peng, Shanghai (CN); Guanchen Li, Shanghai (CN); Yang Zhao, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/543,839

(22) Filed: Dec. 18, 2023

(65) Prior Publication Data

US 2024/0121844 A1 Apr. 11, 2024

Related U.S. Application Data

(63) Continuation of application No. 17/402,155, filed on Aug. 13, 2021, now abandoned, which is a (Continued)

(30) Foreign Application Priority Data

Feb. 15, 2019 (CN) .......................... 201910118111.5

(51) Int. Cl.
    *H04W 76/15* (2018.01)
    *H04L 1/1867* (2023.01)
    (Continued)

(52) U.S. Cl.
    CPC ........... *H04W 76/15* (2018.02); *H04L 1/1896* (2013.01); *H04W 8/28* (2013.01); *H04W 36/0069* (2018.08)

(58) Field of Classification Search
    None
    See application file for complete search history.

(56) References Cited

U.S. PATENT DOCUMENTS

2017/0325143 A1* 11/2017 Dai ........................ H04W 36/08
2020/0337031 A1* 10/2020 Niu ........................ H04W 72/23
(Continued)

FOREIGN PATENT DOCUMENTS

CN        101686517        3/2010
CN        101779386        7/2010
(Continued)

OTHER PUBLICATIONS

3GPP TS 23.003 V15.6.0 (Dec. 2018), "3rd Generation Partnership Project; Technical Specification Group Core Network and Terminals; Numbering, addressing and identification (Release 15)," Dec. 2018, 130 pages.
(Continued)

*Primary Examiner* — The Hy Nguyen
(74) *Attorney, Agent, or Firm* — Fish & Richardson P.C.

(57) ABSTRACT

Embodiments of this application provide methods and apparatuses for handing over a terminal side device from a source access network side device to a target access network side device. In an implementation, a method includes: sending, by the source access network side device, a handover request to the target access network side device, wherein the handover request comprises a first configuration, and the first configuration is a first time division multiplexing (TDM) pattern configuration or a first uplink power configuration, and receiving, by the source access network side device, a handover request acknowledgement from the target access network side device, wherein the handover request acknowledgement comprises a second configuration, and the second configuration comprises one or more of a second TDM pattern configuration, a second uplink power configuration,
(Continued)

| Terminal side device | First access network side device (source master base station) | Second access network side device (secondary base station) | Third access network side device (target master base station) |
|---|---|---|---|

A first configuration, for example, a first TDM pattern configuration, is determined through negotiation in a secondary base station addition or modification procedure RRC message: First configuration 301: Handover request (optionally including the first configuration)

302: Handover request acknowledgement (including a second configuration, for example, a second TDM pattern configuration, or whether to release a first TDM pattern configuration)

303: Handover command (including the second configuration)

304: Random access process or information indicating to release or reserve the first configuration.

20 Claims, 6 Drawing Sheets

Related U.S. Application Data continuation of application No. PCT/CN2020/075405, filed on Feb. 14, 2020.

(51) Int. Cl.
  *H04W 8/28*          (2009.01)
  *H04W 36/00*        (2009.01)

(56) References Cited

U.S. PATENT DOCUMENTS

| | | | | |
|---|---|---|---|---|
| 2020/0359277 A1* | 11/2020 | Liu | ...................... | H04L 5/0055 |
| 2021/0212144 A1* | 7/2021 | Yang | ..................... | H04W 72/12 |
| 2021/0329444 A1 | 10/2021 | Wiemann et al. | | |
| 2022/0046500 A1* | 2/2022 | Yiu | .......................... | H04W 8/24 |
| 2022/0141904 A1* | 5/2022 | Yilmaz | ................. | H04L 5/0035 |
| | | | | 370/329 |

FOREIGN PATENT DOCUMENTS

| | | | | |
|---|---|---|---|---|
| CN | 103583064 | 2/2014 | | |
| CN | 104812008 | 7/2015 | | |
| CN | 105210416 A | 12/2015 | | |
| CN | 105472598 | 4/2016 | | |
| CN | 105636087 | 6/2016 | | |
| CN | 105992393 | 10/2016 | | |
| CN | 107371205 | 11/2017 | | |
| CN | 108810876 | 11/2018 | | |
| CN | 108990116 A | 12/2018 | | |
| CN | 109246759 | 1/2019 | | |
| EP | 2938109 | 10/2015 | | |
| JP | 2015513264 A | 4/2015 | | |
| WO | 2017022166 | 2/2017 | | |
| WO | WO-2017193940 A1 * | 11/2017 | ........... | H04W 36/26 |
| WO | 2018128076 | 7/2018 | | |
| WO | WO-2019000544 A1 * | 1/2019 | ........... | H04W 72/12 |
| WO | 2020139178 | 7/2020 | | |

OTHER PUBLICATIONS

3GPP TS 36.331 V15.3.0 (Sep. 2018), "3rd Generation Partnership Project; Technical Specification Group Radio Access Network; Evolved Universal Terrestrial Radio Access (E-UTRA); Radio Resource Control (RRC); Protocol specification (Release 15)," Sep. 2018, 918 pages.
3GPP TS 36.413 V12.2.0, "3rd Generation Partnership Project; Technical Specification Group Radio Access Network; Evolved Universal Terrestrial Radio Access Network (E-UTRAN); S1 Application Protocol (S1AP) (Release 12)," Jun. 2014, 285 pages.
3GPP TS 36.423 V15.4.0 (Dec. 2018), "3rd Generation Partnership Project; Technical Specification Group Radio Access Network; Evolved Universal Terrestrial Radio Access Network (E-UTRAN);

X2 application protocol (X2AP) (Release 15)," Dec. 2018, 409 pages.
3GPP TS 37.340 V15.4.0 (Dec. 2018), "3rd Generation Partnership Project; Technical Specification Group Radio Access Network; Evolved Universal Terrestrial Radio Access (E-UTRA) and NR; Multi-connectivity; Stage 2(Release 15)," Dec. 2018, 67 pages.
3GPP TS 38.101-3 V15.12.0 (Dec. 2020), "3rd Generation Partnership Project; Technical Specification Group Radio Access Network; NR; User Equipment (UE) radio transmission and reception; Part 3: Range 1 and Range 2 Interworking operation with other radios (Release 15)," Dec. 2018, 183 pages.
3GPP TS 38.213 V15.4.0 (Dec. 2018), "3rd Generation Partnership Project; Technical Specification Group Radio Access Network; NR; Physical layer procedures for control (Release 15)," Dec. 2018, 104 pages.
3GPP TS 38.423 V15.2.0 (Dec. 2018), 3rd Generation Partnership Project; Technical Specification Group Radio Access Network; NG-RAN; Xn application protocol (XnAP) (Release 15), 281 pages.
Catt, "(TP for 38.423) Support of POU session split during Xn handover procedure," 3GPP TSG-RAN WG3 #102, R3-187144, Spokane, USA, Nov. 12-16, 2018, 6 pages.
Ericsson, "UE context handling during inter RAT handover," 3GPP TSG-RAN WG2 #102, R2-1807041, Busan, Korea, May 21-25, 2018, 3 pages.
Extended European Search Report issued in European Application No. 20755822.2 on Jul. 6, 2022, 13 pages.
Huawei, Vodafone, "Discussion on the Masked IMEISV," 3GPP TSG-RAN3 Meeting #103, R3-190514, Athens, Greece, Feb. 25-Mar. 1, 2019, 2 pages.
Huawei, Vodafone, "Introduce IMEISV to Addition Request to Xn," 3GPP TSG-RAN3 Meeting #103, R3-190516, Athens, Greece, Feb. 25-Mar. 1, 2019, 8 pages.
Huawei, Vodafone, "Introduction of IMEISV to Addition Request over X2," 3GPP TSG-RAN3 Meeting #103, R3-190515, Athens, Greece, Feb. 25-Mar. 1, 2019, 9 pages.
Nokia, Alcatel-Lucent Shanghai Bell, "Pseudo-CR on Requirements for Interworking with E-UTRAN connected to EPC," 3GPP TSG CT4 Meeting #79, C4-174021, Krakow, Poland, Aug. 21-25, 2017, 5 pages.
Office Action in Japanese Appln. No. 2021-547431, mailed on Jun. 20, 2023, 4 pages (with English translation).
Office Action issued in Chinese Application No. 201910118111.5 on Jan. 28, 2021, 31 pages (with English translation).
Office Action issued in Chinese Application No. 201910118111.5 on Jul. 26, 2021, 7 pages.
Office Action issued in Japanese Application No. 2021-547431 on Nov. 1, 2022, 8 pages (with English translation).
PCT International Search Report and Written Opinion issued in International Application No. PCT/CN2020/075405 on May 14, 2020, 15 pages (with English translation).
Nokia et al., "Simultaneous connectivity handover with single uplink operation," 3GPP TSG-RAN WG2 Meeting #105, R2-1900618, Athens, Greece, Feb. 25-Mar. 1, 2019, 5 pages.
Huawei et al., "Discussion on the tdm-PatternConfig handling," 3GPP TSG-RAN WG2 Meeting#105, R2-1902032, Athens, Greece, Feb. 25-Mar. 1, 2019, 3 pages.
Office Action in Japanese Appln. No. 2023-180931, mailed on Jan. 28, 2025, 7 pages (with English translation).
Action in Japanese Appln. No. 2023-180931, mailed on Jun. 11, 2025, 6 pages (with English translation).

* cited by examiner

COMMUNICATION PROCESSING METHOD OF TERMINAL INFORMATION AND RELATED DEVICE

CROSS-REFERENCE TO RELATED APPLICATIONS

This application is a continuation of U.S. patent application Ser. No. 17/402,155, filed on Aug. 13, 2021, which is a continuation of International Application No. PCT/CN2020/075405, filed on Feb. 14, 2020, which claims priority to Chinese Patent Application No. 201910118111.5, filed on Feb. 15, 2019. All of the afore-mentioned patent applications are hereby incorporated by reference in their entireties.

TECHNICAL FIELD

Embodiments of this application relate to the wireless communication field, and in particular, to a communication processing technology of terminal information.

BACKGROUND

In a wireless communication system, connections are established on an uplink and a downlink between a terminal side device and an access network side device (for example, a base station) according to each protocol layer defined by the 3rd generation partnership project (3GPP) organization, to transmit various types of data. The data is control signaling or service data. These protocol layers mainly include a physical (PHY) layer, a media access control (MAC) layer, a radio link control (RLC) layer, a packet data convergence protocol (PDCP) layer, a radio resource control (RRC) layer, and the like.

The terminal side device may establish connections to at least two access network side devices in a master cell group and a secondary cell group at the same time, to improve data transmission efficiency. This connection manner is referred to as dual connectivity. The access network side device corresponding to the master cell group may be referred to as a master base station, and the access network side device corresponding to the secondary cell group may be referred to as a secondary base station. In a dual connectivity scenario of the master base station and the terminal side device, in a process of implementing dual connectivity, or in an inter-base station handover scenario, configurations configured by the two base stations may be incompatible for the terminal side device. Consequently, data transmission efficiency is reduced.

SUMMARY

In view of the foregoing technical problem, one aspect of embodiments of this application provides a communication processing method of terminal information and a related device.

A first aspect of the embodiments of this application provides a communication processing method of terminal information, including the following content.

In a scenario of implementing dual connectivity for a terminal, a first access network side device sends a secondary base station addition request message to a second access network side device, where the secondary base station addition request message includes software version information of the terminal side device. The first access network side device receives a secondary base station addition acknowledgement message sent by the second access network side device, where the secondary base station addition acknowledgement message includes a configuration determined based on the software version information.

Optionally, the software version information of the terminal side device is a masked international mobile equipment identity and software version number masked IMEISV. Optionally, the software version information indicates a manner in which the terminal side device implements a technical characteristic.

A second aspect of the embodiments of this application provides a communication processing method of terminal information, including the following content.

In a process of handing over a terminal side device from a source access network side device to a target access network side device: The source access network side device sends a handover request to the target access network side device, where the handover request includes a first configuration when the terminal side device is served by the source access network side device or information indicating whether the first configuration exists, and the first configuration is a first time division multiplexing pattern TDM pattern configuration or a first uplink power configuration. The source access network side device receives a handover request acknowledgement sent by the target access network side device, where the handover request acknowledgement includes a second configuration, and the second configuration includes one or a combination of the following: a second TDM pattern configuration when the terminal side device is served by the target access network side device; a second uplink power configuration when the terminal side device is served by the target access network side device; and information indicating to release or reserve the first configuration.

Optionally, in a dual connectivity scenario of the terminal side device, the source access network side device is a master base station serving the terminal side device in the dual connectivity scenario, and a secondary base station serving the terminal side device in the dual connectivity scenario remains unchanged.

Optionally, when the second configuration includes the second TDM configuration, the second configuration further includes an effective time point of the second TDM configuration.

Optionally, the effective time point is after the terminal side device is handed over to the target access network side device through a random access process, or after a random access request is sent in the random access process.

A third aspect of the embodiments of this application provides a communication processing method of terminal information, including the following content.

In a process of handing over a terminal side device from a source access network side device to a target access network side device:

The terminal side device receives a handover command sent by the source access network side device, where the handover command instructs to hand over the terminal side device to the target access network side device. The terminal side device releases a first configuration, and accesses the target access network side device through a random access process according to the handover command, where the first configuration is a first time division multiplexing pattern TDM pattern configuration or a first uplink power configuration when the terminal side device is served by the source access network side device.

A fourth aspect of the embodiments of this application provides a communication processing method of terminal information, including the following content.

In a process of handing over a terminal side device from a source access network side device to a target access network side device: The terminal side device receives a handover command sent by the source access network side device, where the handover command instructs to hand over the terminal side device to the target access network side device. In a process in which the terminal side device accesses the target access network side device according to the handover command and through a random access process, the terminal side device makes a second configuration take effect at an effective time point, and accesses the target access network side device based on the second configuration, where the second configuration is a second time division multiplexing pattern TDM pattern configuration or a second uplink power configuration when the terminal side device is served by the target access network side device, and the effective time point is after a random access request is sent in the random access process or after the random access process is completed.

Optionally, the handover command further indicates the effective time point.

A fifth aspect of the embodiments of this application provides an access network side device, and the access network side device includes a receiving unit and a sending unit. The receiving unit is configured to perform a receiving action in the first aspect or the second aspect, and the sending unit is configured to perform a sending action in the first aspect or the second aspect. The access network side device provided in the second aspect may be an independent base station, or may be a chip system that implements a function of the base station. The chip system includes a processor including at least one gate circuit and a memory including at least one gate circuit. Each gate circuit includes at least one transistor (for example, a field effect transistor) connected by using a wire, and each transistor is made of a semiconductor material. Further, the receiving unit and the sending unit are respectively a receiving circuit and a sending circuit in a specific implementation. The access network side device may further include other electronic lines, for example, lines used to connect the receiving circuit and the sending circuit and a radio frequency antenna used for signal sending.

A sixth aspect of the embodiments of this application provides a terminal side device, where the terminal side device includes a receiving unit, a sending unit, and a processing unit. The receiving unit is configured to perform a receiving action in the third aspect or the fourth aspect, and the sending unit is configured to perform a sending action in the third aspect or the fourth aspect. The terminal side device provided in the second aspect may be an independent terminal, or may be a chip system that implements a function of the terminal. Further, the receiving unit and the sending unit are respectively a receiving circuit and a sending circuit in a specific implementation, and the processing unit is specifically a processing circuit. The terminal side device may further include other electronic lines, for example, lines used to connect the receiving circuit and the sending circuit and a radio frequency antenna used for signal sending.

A seventh aspect of the embodiments of this application provides a computer-readable storage medium, where the computer-readable storage medium includes program code, and the program code is used to implement the technical solutions provided in the first aspect, the second aspect, the third aspect, and the fourth aspect.

DESCRIPTION OF EMBODIMENTS

Figure 1:
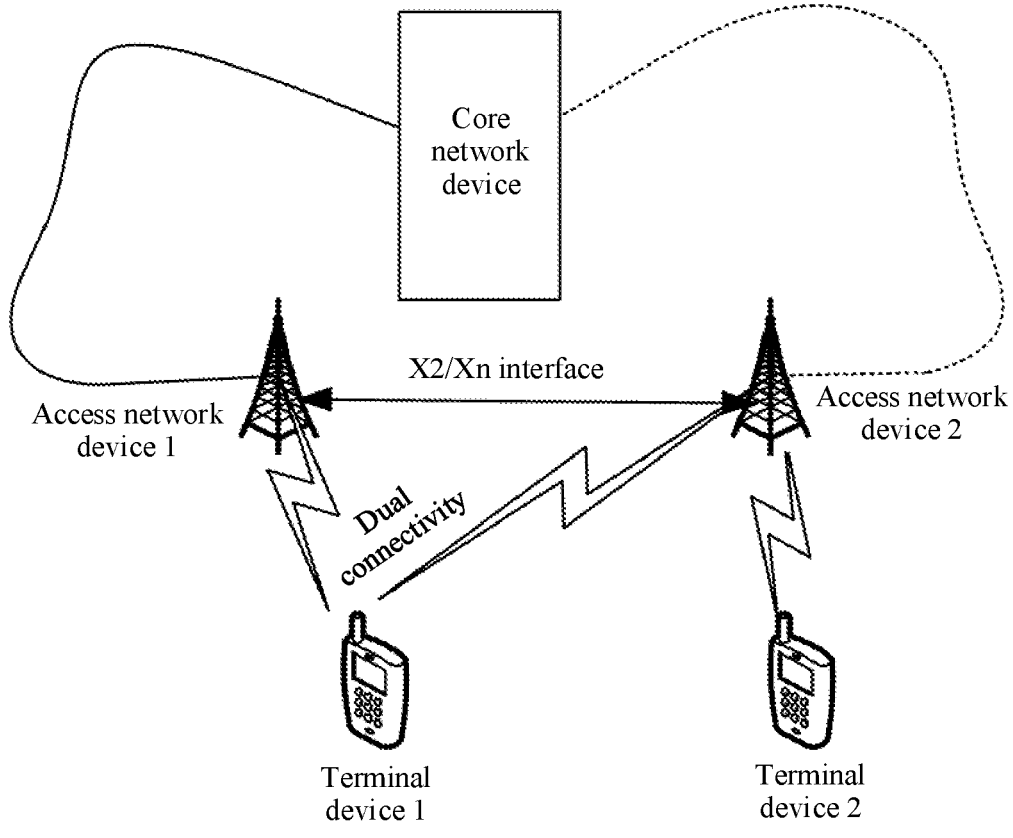
FIG. 1 is a schematic architectural diagram of a system according to an embodiment of this application.

In a schematic diagram of a protocol stack architecture of a wireless communication system shown in FIG. 1, the wireless communication system includes a terminal side device and an access network side device, and optionally further includes a core network side device.

The terminal side device may be an independently sold terminal or a chip system in the terminal. The terminal, also referred to as user equipment (UE) or a mobile station, includes mobile phones, handheld internet of things devices, wearable devices, and the like.

The access network side device may be an independently sold base station or a chip system configured to implement a function of the base station. The base station may be classified into two types: a macro base station and a small base station. The small base station is further classified into a micro base station, a pico base station, and the like.

At least one radio bearer (RB) is established between the terminal side device and the base station to transmit data. The data may include signaling data or service data. A radio bearer mainly used for signaling data transmission is a signaling radio bearer (SRB), and a radio bearer mainly used for service data transmission is a data radio bearer (DRB). The service data includes enhanced mobile broadband (eMBB) data, massive machine-type communication (mMTC) data, ultra-reliable low-latency communication (URLLC) data, and the like.

As shown in FIG. 1, an access network side device 2 may be directly connected to the core network side device in a wired manner, or may be first connected to an access network side device 1 in a wired manner, and then the access network side device 1 performs forwarding and indirectly connects the access network side device 2 to the core network side device. A terminal side device 1 may be served by both the access network side device 1 and the access network side device 2 at the same time by using a dual connectivity technology. One of the access network side device 1 and the access network side device 2 serves as a master base station of the terminal side device, and the other one serves as a secondary base station of the terminal side device. The master base station is corresponding to a master cell group (MCG), and the secondary base station is corresponding to a secondary cell group (SCG).

In an evolved universal terrestrial radio access-new radio dual connectivity (EN-DC) architecture, the core network side device is an evolved packet core (EPC), the access network side device 1 is a long term evolution (LTE) base station that serves as the master base station, and the access network side device 2 is a new radio (NR) base station (namely, a 5G base station) that serves as the secondary base station. In this architecture, an X2 interface is used between the LTE base station and the NR base station, includes a control plane connection, and optionally further includes a user plane connection. An S1 interface is used between the LTE base station and the EPC, includes a control plane connection, and optionally further includes a user plane connection. An S1-U interface is used between the NR base station and the EPC, and includes only a user plane connection.

In a new radio-evolved universal terrestrial radio access (NE-DC) architecture, the core network side device is a 5G core network side device, the access network side device 1 is an NR base station that serves as the master base station, and the access network side device 2 is an LTE base station that serves as the secondary base station. In this architecture, an X2 interface is used between the LTE base station and the NR base station, includes a control plane connection, and optionally further includes a user plane connection. An NG interface is used between the NR base station and the 5G core network side device, includes a control plane connection, and optionally further includes a user plane connection. An NG-U interface is used between the LTE base station and the 5G core network side device, and includes only a user plane connection.

In a next generation radio access network evolved universal terrestrial radio access-new radio dual connectivity (NGEN-DC) architecture, the core network side device is a 5G core network device, the access network side device 1 is an LTE base station that serves as the master base station, and the access network side device 2 is an NR base station that serves as the secondary base station. In this architecture, an Xn interface is used between the LTE base station and the NR base station, includes a control plane connection, and optionally further includes a user plane connection. An NG-U interface is used between the LTE base station and the 5G core network device, includes a control plane connection, and optionally further includes a user plane connection. Only a user plane connection is included between the NR base station and the 5G core network device.

In a new radio-dual connectivity (NR-DC) scenario, the core network side device is a 5G core network device, and the access network side device 1 and the access network side device 2 are respectively a master NR base station and a secondary NR base station. An Xn interface is used between the NR base stations, includes a control plane connection, and optionally further includes a user plane connection. An NG interface is used between the master NR base station and the 5G core network device, includes a control plane connection, and optionally further includes a user plane connection. An NG-U interface is used between the secondary NR base station and the 5G core network device, and includes only a user plane connection.

In the wireless communication system, when the terminal side device is manufactured, a manufacturer configures a corresponding software version number (SVN), where the software version number indicates software version information currently used by the terminal side device. In a process from being powered on to establishing a connection to the core network side device, the terminal side device includes the SVN in a masked international mobile equipment identity and software version number (IMEISV), and notifies the core network side device by using a non-access stratum (NAS). The IMEISV is generally 16 bits and includes three components: an 8-bit type allocation code (TAC), a 6-bit serial number (SNR), and a 2-bit SVN. The core network side device may set the last four bits of the SNR in the IMEISV to 1, to generate a masked IMEISV, and then send the masked IMEISV to an access network side device serving the terminal side device.

The access network side device generates a corresponding configuration for the terminal based on the masked IMEISV, to ensure that a network service is compatible with a software version of the terminal side device. However, in a dual connectivity scenario or in a process of implementing dual connectivity, because the terminal side device is served by at least two access network side devices at the same time, configurations by the at least two access network side devices may be incompatible with the terminal side device, reducing data transmission efficiency.

Figure 2:
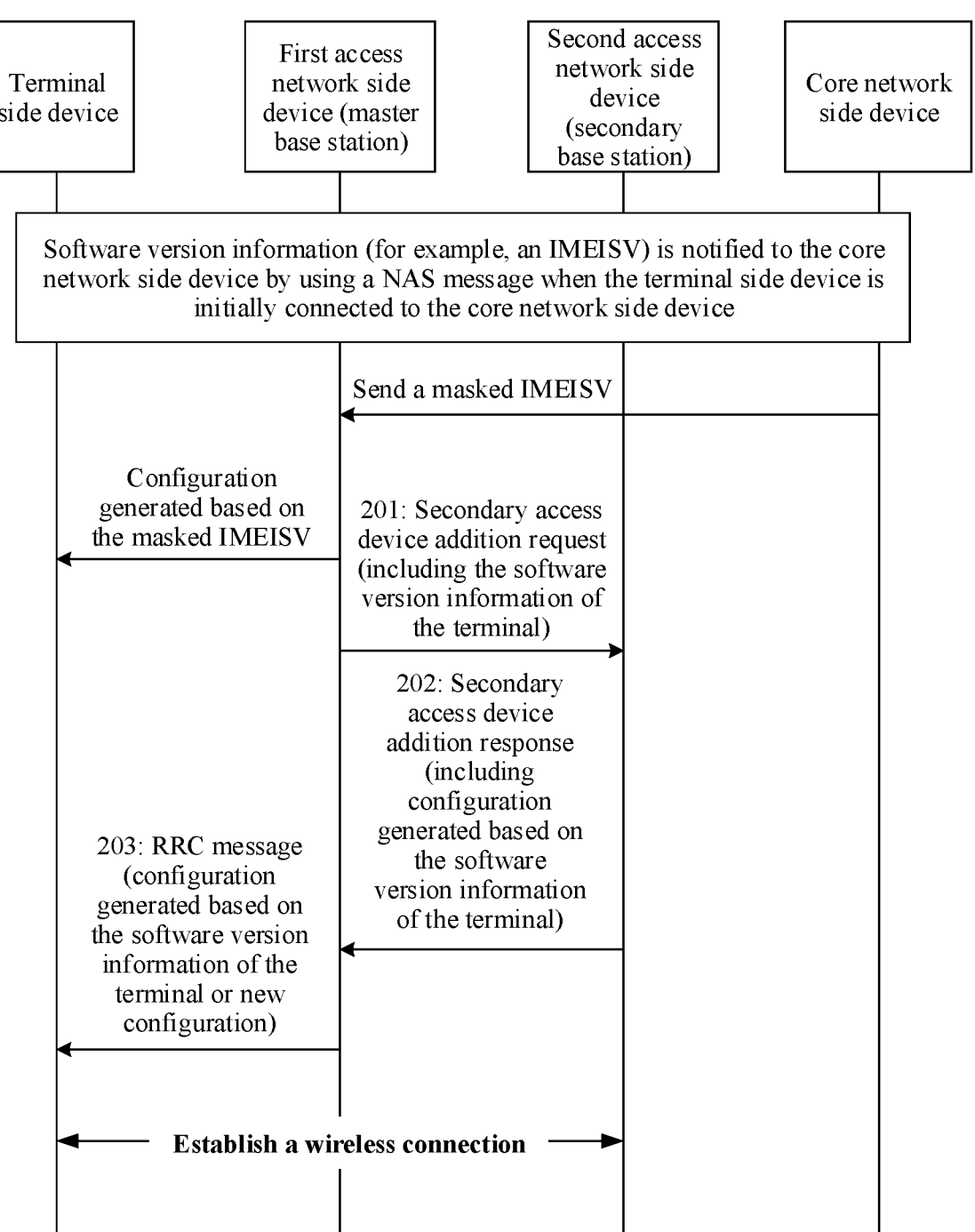
FIG. 2 is a schematic diagram of system interaction of a communication processing method of terminal information according to a first embodiment of this application.

In view of this problem, a first embodiment of this application provides a communication processing method of terminal information, which is applied to a scenario in which a secondary base station is added to implement dual connectivity for a terminal side device. As shown in FIG. 2, the method includes the following content.

S201: A first access network side device sends a secondary base station addition request message to a second access network side device, where the secondary base station addition request message includes software version information of the terminal side device.

S202: The first access network side device receives a secondary base station addition acknowledgement message sent by the second access network side device, where the secondary base station addition acknowledgement message includes a configuration determined based on the software version information.

Optionally, the software version information of the terminal is an IMEISV or a masked IMEISV In 201, the first access network side device may determine whether to add the second access network side device as a secondary base station of the terminal side device, to implement dual connectivity for the terminal. If determining to add the secondary base station, the first access network side device sends the secondary base station addition request message to the second access network side device.

In 202, the second access network side device may determine, based on the received secondary base station addition request message, whether the dual connectivity can be implemented for the terminal side device. If the dual connectivity can be implemented for the terminal side device, the second access network side device identifies, based on the software version information of the terminal side device, a manner in which the terminal side device implements various technical characteristics, and further generates a corresponding configuration for the terminal side device. Then, the second access network side device includes the configuration in the secondary base station addition acknowledgement message, and sends the secondary base station addition acknowledgement message to the first access network side device. A "technical characteristic" in the embodiments of this application may refer to various capabilities supported by the terminal side device, for example, whether a device-to-device connection is supported, whether minimization of drive tests (MDT) is supported, whether a capability of providing a relay service to a network side device for another terminal side device is supported, and whether carrier aggregation is supported. The access network side device may generate corresponding configurations based on different technical characteristics.

S203: The first access network side device sends the configuration generated by the second access network side device to the terminal side device, or the first access network side device generates a new configuration after referring to the configuration and sends the new configuration to the terminal side device.

Optionally, the secondary base station addition request message may include a TDM pattern configuration determined by the first access network side device. The second access network side device may determine a recommended TDM pattern configuration based on the received TDM pattern configuration, and send, to the first access network side device, the recommended TDM pattern configuration in the secondary base station addition request message, so that the first access network side device forwards the recommended TDM pattern configuration to the terminal side device, or generates a new TDM pattern configuration with reference to the recommended TDM pattern configuration, and sends the new TDM pattern configuration to the terminal side device. A TDM pattern indicates a time period for performing data transmission with the first access network side device and a time period for performing data transmission with the second access network side device.

After the dual connectivity is completed, the first access network side device serves as a master base station, and the second access network side device serves as the secondary base station, to jointly serve the terminal side device. The terminal side device may perform data transmission with the master base station and the secondary base station based on the configuration, where the configuration optionally further includes the TDM pattern configuration received from the first access network side device.

By applying the technical solution provided in the first embodiment of this application, in the dual connectivity, the secondary base station participates in generating a related configuration corresponding to the software version information of the terminal, to reduce a possibility that an incompatibility problem occurs between configuration for the terminal side device configured by access network side devices, thereby improving data transmission efficiency.

In a dual connectivity scenario, the terminal side device may perform data transmission with the first access network side device and the second access network side device. However, as the terminal side device moves, the master base station may be handed over from the first access network side device to another access network side device (which is assumed to be a third access network side device). After the handover, the terminal side device may still use the configuration before the handover to perform data transmission. As a result, data transmission efficiency after the handover is reduced, and the data transmission efficiency is greatly reduced especially when the configuration is a TDM pattern configuration or an uplink power configuration.

Figure 3:
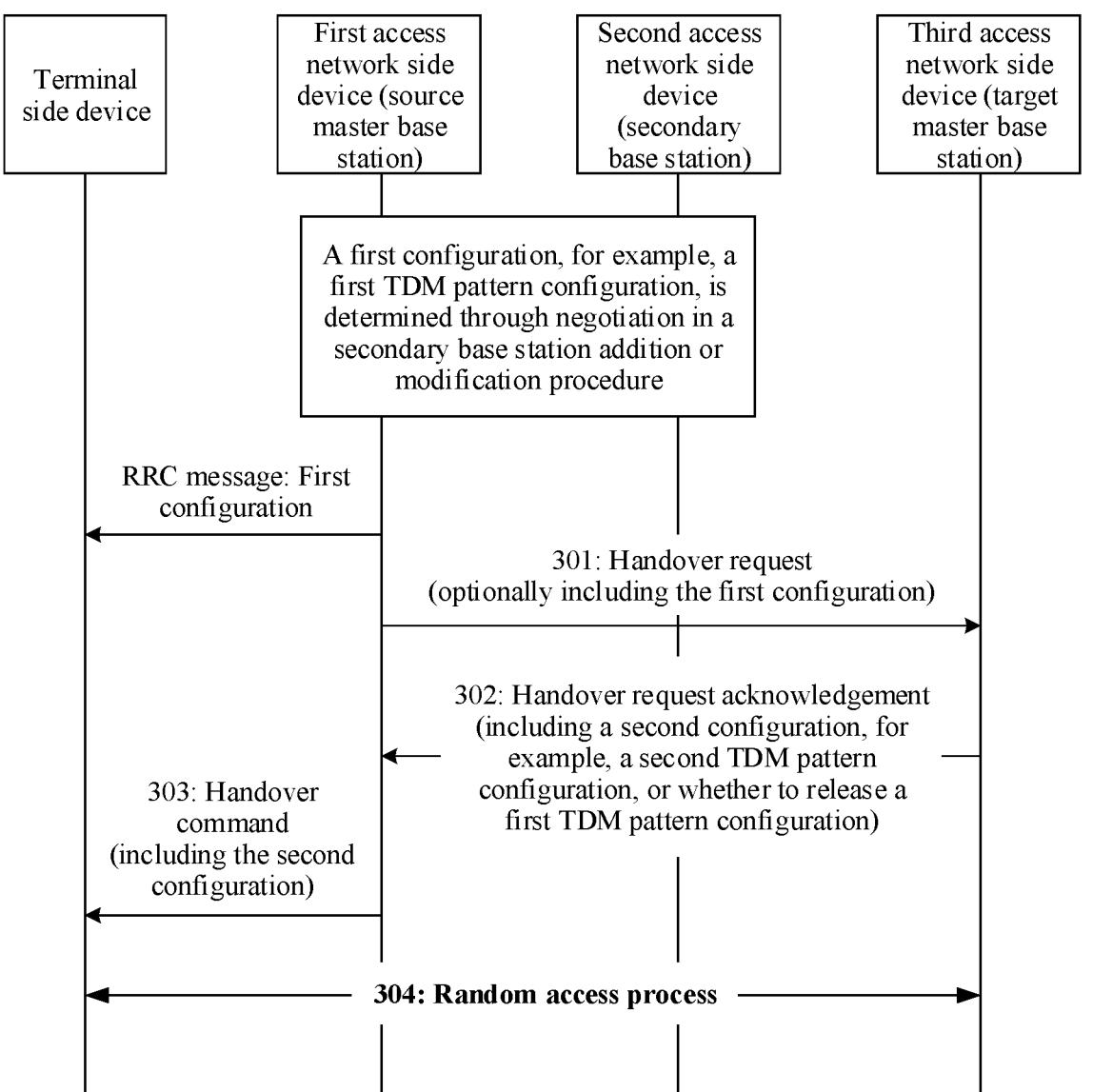
FIG. 3 is a schematic diagram of system interaction of a communication processing method of terminal information according to a second embodiment of this application.

In view of the foregoing technical problem, a second embodiment of this application provides a communication processing method of terminal information, which is applied to a dual connectivity scenario. As shown in FIG. 3, the method includes the following content. In the dual connectivity scenario, a first access network side device is a master base station of a terminal side device, a second access network side device is a secondary base station of the terminal side device, and a third access network side device is a target base station to which the terminal side device is to be handed over.

S301: The first access network side device sends a handover request to the third access network side device.

Optionally, the handover request includes a first configuration or indicates whether the first configuration exists, where the first configuration includes at least one of: a first time division multiplexing pattern TDM pattern configuration when the terminal side device is served by the first access network side device (that is, before handover), and a first uplink power configuration.

The first TDM pattern is used to indicate a time period in which the terminal side device can perform uplink transmission to the source base station and a time period in which the terminal side device can perform uplink transmission to the secondary source base station, where the terminal side device is configured with dual connectivity. The first uplink power configuration indicates a maximum power used by the terminal side device to perform uplink sending to the master base station or the secondary base station.

S302: The third access network side device sends a handover request acknowledgement to the first access network side device.

Optionally, the handover request acknowledgement includes a second configuration, where the second configuration includes one or a combination of the following:

a second TDM pattern configuration when the terminal side device is served by the third access network side device (that is, after the handover is completed); a second uplink power configuration (where the second uplink power configuration indicates a maximum power used by the terminal side device to perform uplink sending to the target base station) when the terminal side device is served by the third access network side device (after the handover is completed); and information indicating to release or reserve the first configuration.

Figure 4:
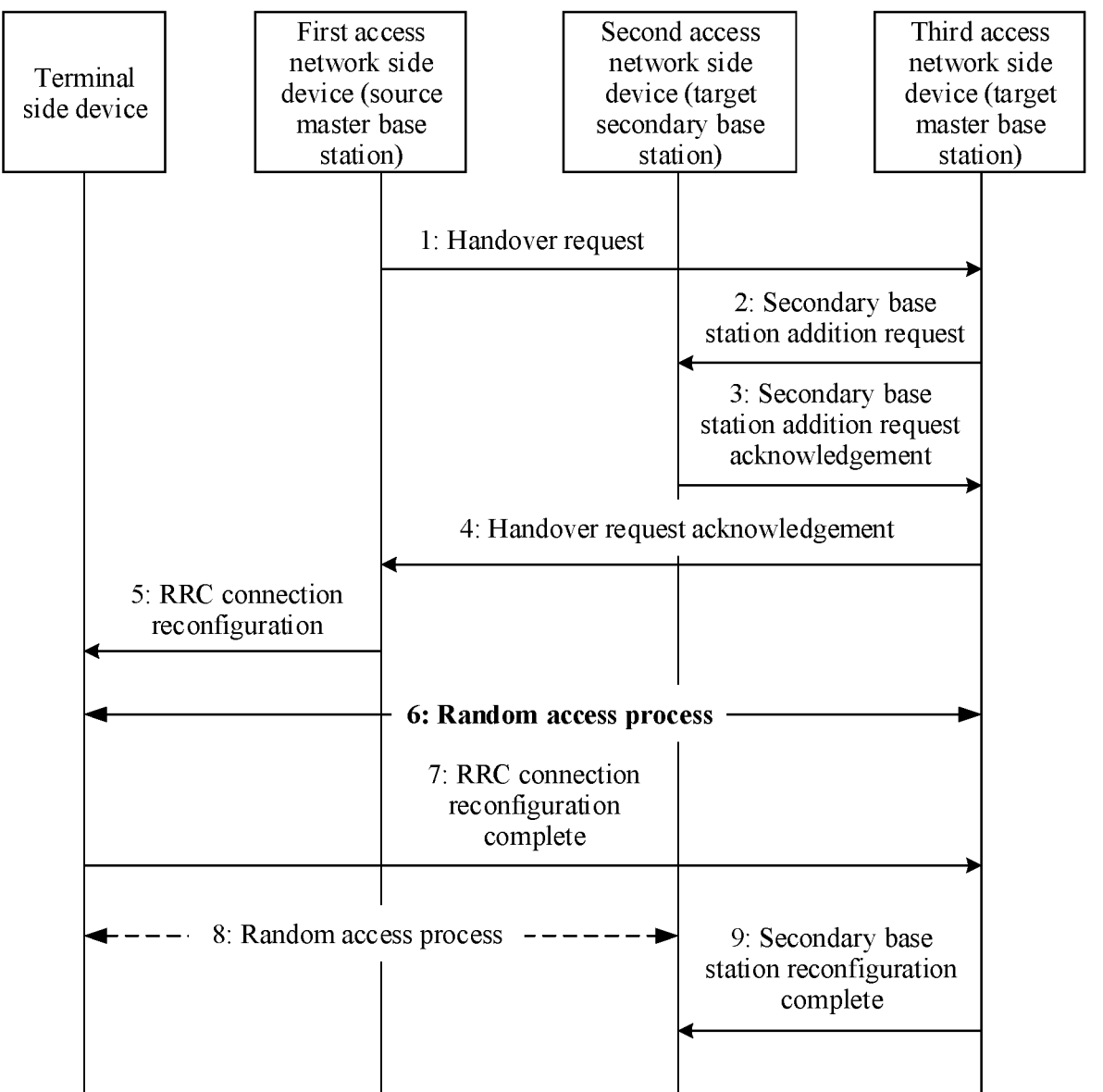
FIG. 4 is a schematic diagram of system interaction for adding a secondary base station in a handover process according to this application.
Figure 5:
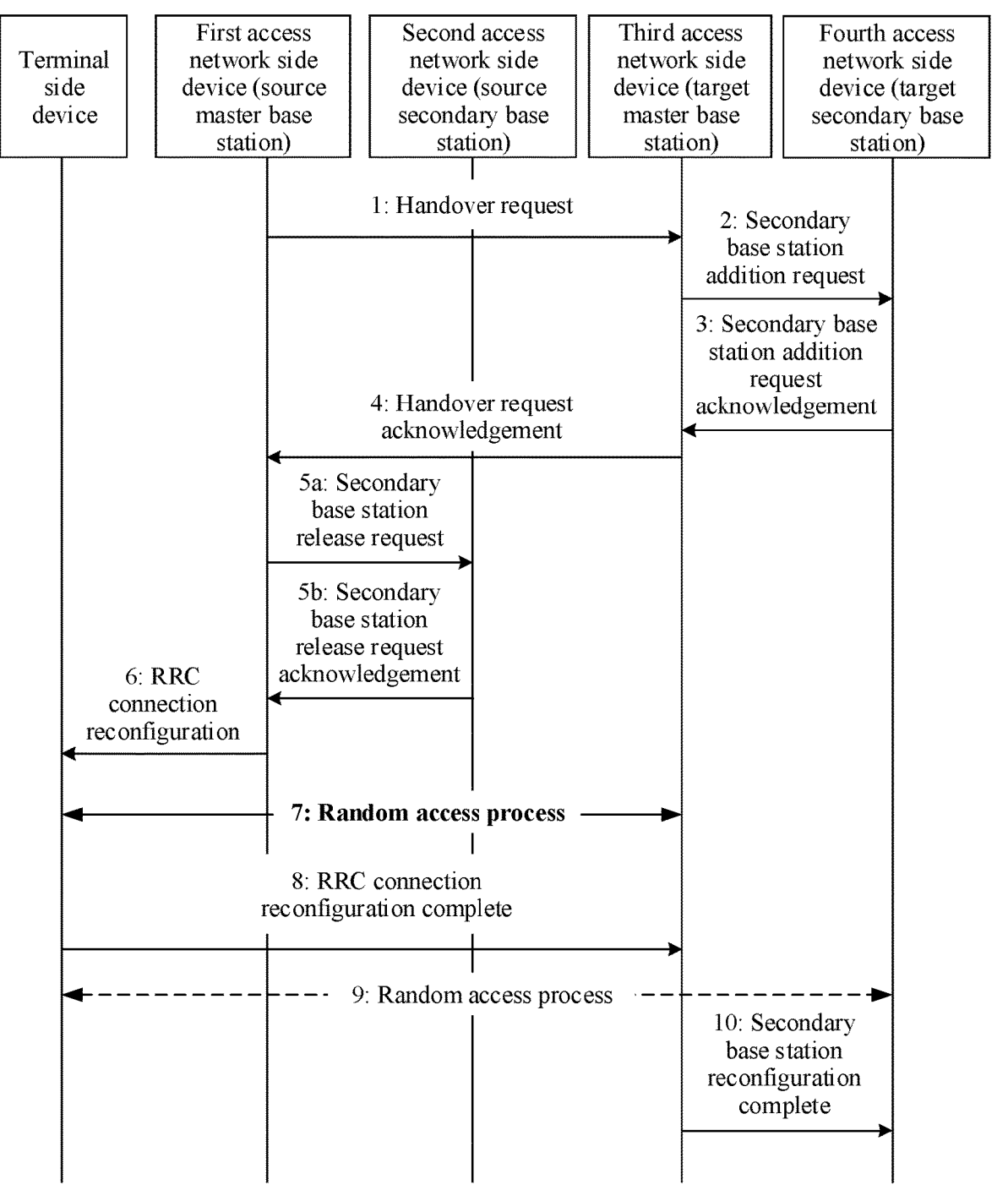
FIG. 5 is a schematic diagram of system interaction for changing a secondary base station in a handover process according to this application.

Optionally, the third access network side device may be used as a target master base station to determine to add a target secondary base station (as shown in FIG. 4) for the terminal side device in a handover process, or change a secondary base station for the terminal side device in the handover process (that is, change a source secondary base station to the target secondary base station, as shown in FIG. 5), to implement dual connectivity after the handover. The third access network side device may configure the second TDM pattern. The second TDM pattern indicates a time period in which the terminal side device performs uplink transmission to the target master base station and a time period in which the terminal side device performs uplink transmission to the target secondary base station. Optionally, the target secondary base station may be the source secondary base station. In this case, in the handover process, the source secondary base station remains unchanged as the secondary base station of the terminal side device before and after the handover.

Optionally, the second access network side device, serving as the secondary base station, remains unchanged before, during, and after the handover.

Optionally, when the second configuration includes the second TDM pattern configuration, the second configuration further includes an effective time point of the second TDM pattern configuration. The first access network side device may forward the second configuration to the terminal side device. The terminal side device may make the second TDM pattern configuration take effect at the effective time point, and communicate with the third access network side device based on the second TDM pattern configuration. Optionally, in another implementation, the second configuration may include timing duration of a timer specific to the second TDM pattern configuration. After the timer expires, the terminal side device makes the second TDM pattern configuration take effect.

The effective time point may be after the terminal side device accesses the third access network side device by performing a random access process (that is, after S304 is completed), or after a random access request is sent in the random access process. The random access request may be a random access preamble or a demodulation reference signal (DMRS). In this implementation, performing the random access process or sending the random access request by the terminal side device is not limited by the TDM pattern configuration.

Optionally, in 302, the third access network side device determines whether dual connectivity is configured after the terminal side device is handed over, and whether an interference or power sharing problem may exist. If dual connectivity is not configured, dual connectivity is configured but no interference exists, or dual connectivity is configured but no power sharing problem exists, the second configuration indicates to release the first configuration. If dual connectivity is configured and an interference or power sharing problem exists, the second configuration includes information indicating to reserve the first configuration, the second TDM pattern configuration, or the second uplink power configuration.

Optionally, when the handover request includes the first configuration, the third access network side device may determine the second configuration based on the first configuration. When the handover request includes an indication indicating whether the first configuration exists, the third access network side device may autonomously determine the second configuration. If the third access network side device determines that the second TDM pattern configuration or the second uplink power configuration needs to be configured, the second configuration includes the second TDM pattern configuration or the second uplink power configuration. If the third access network side device determines that neither the second TDM pattern configuration nor the second uplink power configuration needs to be configured, the second configuration includes information indicating to release the first configuration.

Optionally, when the handover request does not include the first configuration, the third access network side device autonomously determines the second configuration. For example, if the third access network side device determines that the TDM pattern does not need to be configured, the second configuration includes an indication for releasing the first configuration. If the TDM pattern needs to be configured, the second configuration includes the second TDM pattern configuration or the uplink power configuration.

S303: The source base station sends a handover command to the terminal side device. Optionally, the handover command includes the second configuration.

S304: The terminal side device accesses the third access network side device by performing the random access process.

In 304, when the handover command includes the second configuration, the terminal side device may communicate with the third access network side device based on the second configuration in the random access process or after the random access process is completed. When the handover command does not include the second configuration, the terminal side device releases the first configuration by default.

By applying the technical solution provided in the second embodiment, the terminal side device can maintain a configuration that is consistent with that of the third access network side device, thereby avoiding a problem that efficiency of communication between the terminal side device and the target base station is reduced because the terminal side device uses an inappropriate configuration.

Figure 6:
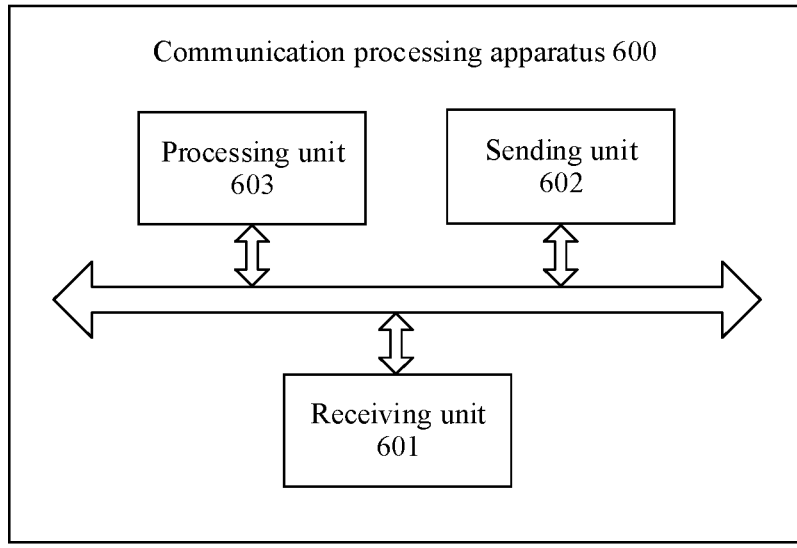
FIG. 6 is a schematic structural diagram of a communication processing device according to an embodiment of this application.

A third embodiment of this application provides a communication processing apparatus 600. FIG. 6 is a schematic structural diagram of units of the communication processing apparatus. The communication processing apparatus 600 includes a receiving unit 601 and a sending unit 602.

The communication processing apparatus 600 provided in the third embodiment of this application may be the terminal side device in the first embodiment or the second embodiment, and performs the method performed by the terminal side device. Correspondingly, the communication processing apparatus 600 further includes a processing unit 603. Specifically, the receiving unit 601 is configured to perform a receiving action of the terminal side device in the first embodiment, the second embodiment, or the third embodiment, the sending unit 602 is configured to perform a sending action of the terminal side device, and the processing unit 603 is configured to perform a processing action, such as determining, of the terminal side device. For details, refer to the content described in the first embodiment, the second embodiment, and the third embodiment.

The communication processing apparatus 600 provided in the third embodiment of this application may alternatively be an access network side device, and is configured to implement the method performed by the access network side device in the first embodiment or the second embodiment. Specifically, the receiving unit 601 is configured to perform a receiving action of the access network side device, and the sending unit 602 is configured to perform a sending action of the access network side device. For details, refer to the content described in the first embodiment, the second embodiment, and the third embodiment.

Figure 7:
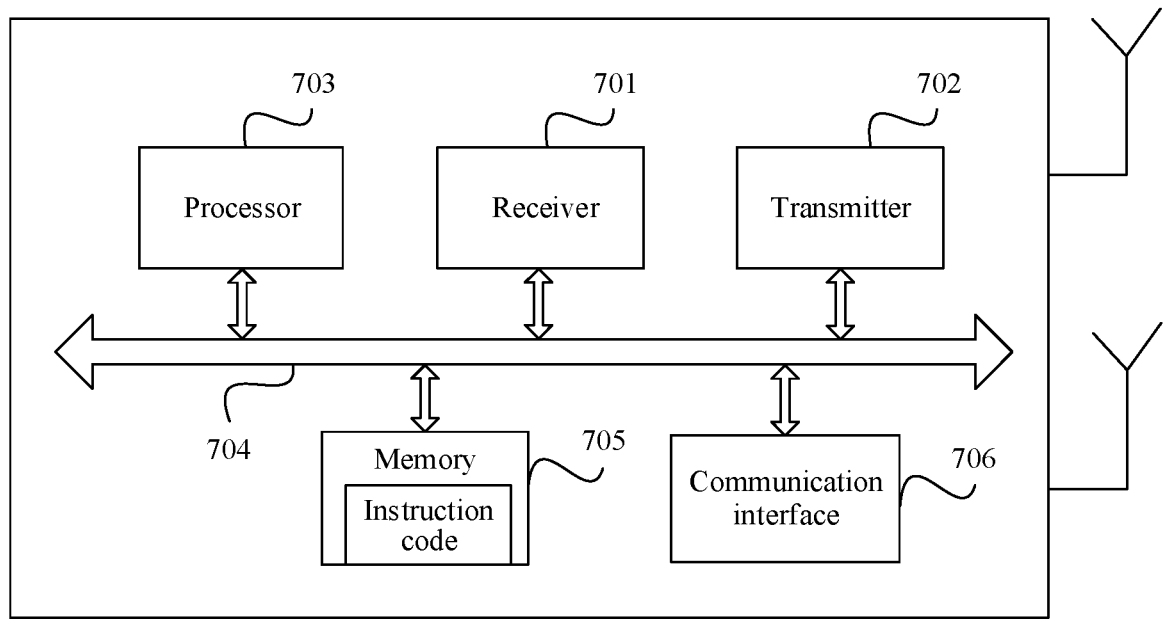
FIG. 7 is a schematic structural diagram of hardware of a communication processing device according to an embodiment of this application.

In a specific hardware implementation, as shown in a schematic structural diagram of hardware of the communication processing apparatus in FIG. 7, a function of the receiving unit 601 may be specifically implemented by a receiver 701, a function of the sending unit 602 may be implemented by a transmitter 702, and a function of the processing unit 603 may be specifically implemented by a processor 703. The communication processing apparatus may further include various electronic lines, for example, a bus 704, a memory 705, and a communication interface 706. The memory may include instruction code. When the instruction code is invoked by the processor 703, a function of the access network side device or the terminal side device in the first embodiment or the second embodiment is implemented.

A person skilled in the art should understand that the embodiments of the present invention may be provided as methods, systems, or computer program products. Therefore, the present invention may use a form of hardware only embodiments, software only embodiments, or embodiments with a combination of software and hardware. Moreover, the present invention may use a form of a computer program product that is implemented on one or more chip systems or computer-usable storage media (including but not limited to a disk memory, a CD-ROM, an optical memory, and the like) that include computer-usable program code.

The present invention is described with reference to the flowcharts and/or block diagrams of the method, the apparatus (system), and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a special-purpose computer, an embedded processor, or a processor of another programmable data processing device to generate a machine, so that the instructions executed by a computer or the processor of the another programmable data processing device generate an apparatus for implementing a specific function in one or more processes in the flowcharts and/or in one or more blocks in the block diagrams.

These computer program instructions may be stored in a computer-readable memory that can instruct the computer or the another programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

These computer program instructions may alternatively be loaded onto a computer or another programmable data processing device, so that a series of operations and steps are performed on the computer or the another programmable device, to generate computer-implemented processing. Therefore, the instructions executed on the computer or the another programmable device provide steps for implementing a specific function in one or more processes in the flowcharts and/or in one or more blocks in the block diagrams.

What is claimed is:

1. A method for handing over a terminal side device from a source access network side device to a target access network side device, comprising:

sending, by the source access network side device, a handover request to the target access network side device, wherein the handover request comprises a first configuration, and the first configuration comprises a first time division multiplexing (TDM) pattern configuration and a first uplink power configuration; and receiving, by the source access network side device, a handover request acknowledgement from the target access network side device, wherein the handover request acknowledgement comprises a second configuration, and the second configuration comprises:

a second TDM pattern configuration;

a second uplink power configuration; and information indicating to release or reserve the first configuration, wherein the information indicating to release or reserve the first configuration is determined based on whether dual connectivity is configured for the terminal side device and whether an interference problem or a power sharing problem exists.

2. The method according to claim 1, wherein the second configuration comprises information indicating to release the first configuration when dual connectivity is not configured for the terminal side device, dual connectivity is configured but no interference exists, or dual connectivity is configured but no power sharing problem exists.

3. The method according to claim 1, wherein the second configuration comprises information indicating to reserve the first configuration when dual connectivity is configured for the terminal side device and an interference problem or a power sharing problem exists.

4. The method according to claim 1, wherein before handing over from the source access network side device, the terminal side device is in dual connectivity with a secondary base station and the source access network side device that serves as a master base station for the terminal side device, and wherein after handing over to the target access network side device, the terminal side device is in dual connectivity with the secondary base station and the target access network side device that serves as a master base station for the terminal side device.

5. A method for handing over a terminal side device from a source access network side device to a target access network side device, comprising:

receiving, by the target access network side device from the source access network side device, a handover request, wherein the handover request comprises a first configuration, and the first configuration comprises a first time division multiplexing (TDM) pattern configuration and a first uplink power configuration; and sending, by the target access network side device to the source access network side device, a handover request acknowledgement, wherein the handover request acknowledgement comprises a second configuration, and the second configuration comprises:

a second TDM pattern configuration;

a second uplink power configuration; and information indicating to release or reserve the first configuration, wherein the information indicating to release or reserve the first configuration is determined based on whether dual connectivity is configured for the terminal side device and whether an interference problem or a power sharing problem exists.

6. The method according to claim 5, wherein the second configuration comprises information indicating to release the first configuration when dual connectivity is not configured for the terminal side device, dual connectivity is configured but no interference exists, or dual connectivity is configured but no power sharing problem exists.

7. The method according to claim 5, wherein the second configuration comprises information indicating to reserve the first configuration when dual connectivity is configured for the terminal side device and an interference problem or a power sharing problem exists.

8. The method according to claim 5, wherein before handing over from the source access network side device, the terminal side device is in dual connectivity with a secondary base station and the source access network side device that serves as a master base station for the terminal side device, and wherein after handing over to the target access network side device, the terminal side device is in dual connectivity with the secondary base station and the target access network side device that serves as a master base station for the terminal side device.

9. A method for handing over a terminal side device from a source access network side device to a target access network side device, comprising:

receiving, by the terminal side device, a handover command sent by the source access network side device, wherein the handover command instructs to hand over to the target access network side device; and releasing, by the terminal side device, a first configuration configured when the terminal side device is served by the source access network side device, wherein the first configuration comprises a first time division multiplexing (TDM) pattern configuration and a first uplink power configuration; and accessing the target access network side device based on the handover command through a random access process, wherein a handover request acknowledgement is received by the source access network side device from the target access network side device, wherein the handover request acknowledgement comprises a second configuration, and the second configuration comprises a second TDM pattern configuration, a second uplink power configuration, and information indicating to release or reserve the first configuration, wherein the information indicating to release or reserve the first configuration is determined based on whether dual connectivity is configured for the terminal side device and whether an interference problem or a power sharing problem exists.

10. The method according to claim 9, wherein before handing over from the source access network side device, the terminal side device is in dual connectivity with a secondary base station and the source access network side device that serves as a master base station for the terminal side device, and wherein after handing over to the target access network side device, the terminal side device is in dual connectivity with the secondary base station and the target access network side device that serves as a master base station for the terminal side device.

11. A source access network side device, comprising at least one processor and at least one memory storing instructions for execution by the at least one processor to cause the source access network side device to perform operations comprising:

sending a handover request to a target access network side device, wherein the handover request comprises a first configuration, and the first configuration comprises a first time division multiplexing (TDM) pattern configuration and a first uplink power configuration; and receiving a handover request acknowledgement from the target access network side device, wherein the handover request acknowledgement comprises a second configuration, and the second configuration comprises:

a second TDM pattern configuration;

a second uplink power configuration; and information indicating to release or reserve the first configuration, wherein the information indicating to release or reserve the first configuration is determined based on whether dual connectivity is configured for a terminal side device and whether an interference problem or a power sharing problem exists.

12. The device according to claim 11, wherein the second configuration comprises information indicating to release the first configuration when dual connectivity is not configured for the terminal side device, dual connectivity is configured but no interference exists, or dual connectivity is configured but no power sharing problem exists.

13. The device according to claim 12, wherein the second configuration comprises information indicating to reserve the first configuration when dual connectivity is configured for the terminal side device and an interference problem or a power sharing problem exists.

14. The device according to claim 11, wherein before handing over from the source access network side device, a terminal side device is in dual connectivity with a secondary base station and the source access network side device that serves as a master base station for the terminal side device, and wherein after handing over to the target access network side device, the terminal side device is in dual connectivity with the secondary base station and the target access network side device that serves as a master base station for the terminal side device.

15. A target access network side device comprising at least one processor and at least one memory storing instructions for execution by the at least one processor to cause the target access network side device to perform operations comprising:

receiving from a source access network side device, a handover request, wherein the handover request comprises a first configuration, and the first configuration comprises a first time division multiplexing (TDM) pattern configuration and a first uplink power configuration; and sending to the source access network side device, a handover request acknowledgement, wherein the handover request acknowledgement comprises a second configuration, and the second configuration comprises:

a second TDM pattern configuration;

a second uplink power configuration; and information indicating to release or reserve the first configuration, wherein the information indicating to release or reserve the first configuration is determined based on whether dual connectivity is configured for a terminal side device and whether an interference problem or a power sharing problem exists.

16. The device according to claim 15, wherein the second configuration comprises information indicating to release the first configuration when dual connectivity is not configured for the terminal side device, dual connectivity is configured but no interference exists, or dual connectivity is configured but no power sharing problem exists.

17. The device according to claim 15, wherein the second configuration comprises information indicating to reserve the first configuration when dual connectivity is configured for a terminal side device and an interference problem or a power sharing problem exists.

18. The device according to claim 15, wherein before handing over from the source access network side device, a terminal side device is in dual connectivity with a secondary base station and the source access network side device that serves as a master base station for the terminal side device, and wherein after handing over to the target access network side device, the terminal side device is in dual connectivity with the secondary base station and the target access network side device that serves as a master base station for the terminal side device.

19. A terminal side device, comprising at least one processor and at least one memory storing instructions for execution by the at least one processor to cause the terminal side device to perform operations comprising:

receiving a handover command sent by a source access network side device, wherein the handover command instructs to hand over to a target access network side device; and releasing a first configuration configured when the terminal side device is served by the source access network side device, wherein the first configuration comprises a first time division multiplexing (TDM) pattern configuration and a first uplink power configuration; and accessing the target access network side device based on the handover command through a random access process, wherein a handover request acknowledgement is received by the source access network side device from the target access network side device, wherein the handover request acknowledgement comprises a second configuration, and the second configuration comprises a second TDM pattern configuration, a second uplink power configuration, and information indicating to release or reserve the first configuration, wherein the information indicating to release or reserve the first configuration is determined based on whether dual connectivity is configured for the terminal side device and whether an interference problem or a power sharing problem exists.

20. The device according to claim 19, wherein before handing over from the source access network side device, the terminal side device is in dual connectivity with a secondary base station and the source access network side device that serves as a master base station for the terminal side device, and wherein after handing over to the target access network side device, the terminal side device is in dual connectivity with the secondary base station and the target access network side device that serves as a master base station for the terminal side device.

\* \* \* \* \*